United States Patent [19]

Johnson

[11] Patent Number: 5,028,064

[45] Date of Patent: Jul. 2, 1991

[54] RACING WHEELCHAIR

[76] Inventor: John W. Johnson, 4239 W. Lawrence La., Phoenix, Ariz. 85051

[21] Appl. No.: 309,315

[22] Filed: Feb. 10, 1989

[51] Int. Cl.[5] .............................................. G02M 1/14

[52] U.S. Cl. ................................ 280/250.1; 280/266; 280/304.1; 297/DIG. 4

[58] Field of Search ...................... 280/250.1, 249, 282, 280/288.1, 220, 266, 268, 271, 290, 304.1, 263, 266; 297/DIG. 4

[56] References Cited

U.S. PATENT DOCUMENTS

| | | | |
|---|---|---|---|
| 558,019 | 4/1896 | Harshaw | 280/290 |
| 2,177,793 | 10/1939 | Taylor | 280/220 |
| 2,681,689 | 6/1954 | Breed | 280/250.1 |
| 2,896,693 | 7/1959 | Schladebach | 280/250.1 |
| 4,066,273 | 1/1978 | Lohr | 280/249 |
| 4,364,580 | 12/1982 | Shapcott | 280/266 |
| 4,586,723 | 5/1986 | Nabinger | 280/263 |
| 4,705,284 | 11/1987 | Stout | 280/250.1 |
| 4,709,939 | 12/1987 | Stewart | 280/250.1 |

*Primary Examiner*—Charles A. Marmor
*Assistant Examiner*—Mitchell Bompey
*Attorney, Agent, or Firm*—Charles E. Cates; James H. Phillips

[57] ABSTRACT

A positively steered racing wheelchair is disclosed which includes a frame support on a pair of large wheels and a positively steerable trailing wheel. A seat for the athlete is suspended from a central position of the frame and is configured such that the athlete sits in a very low position to improve stability and to advantageously place the leverage of the athlete's arms with respect to a pair of drive rings situated outboard the large wheels. Positive steering of the may be accomplished in various ways. One embodiment employs a laterally pivotal seat structure with actuating cables connected to the seat back such that pivotal motion of the seat, as the athlete leans into a turn, is communicated to the trailing wheel to effect steering. Another embodiment utilizes actuating cables attached to cuffs around the athlete's biceps such that the natural tendency to twist into a turn can be translated into steering forces. Yet another embodiment utilizes a harness strapped to the athlete with the actuating cables being attached to shoulder straps of the harness or at a lower position according to the preference and/or capability of the athlete. Still another, and currently the preferred, embodiment employs a hand operated handle adapted for fore and aft movement and coupled through cables to the steerable trailing wheel.

25 Claims, 4 Drawing Sheets

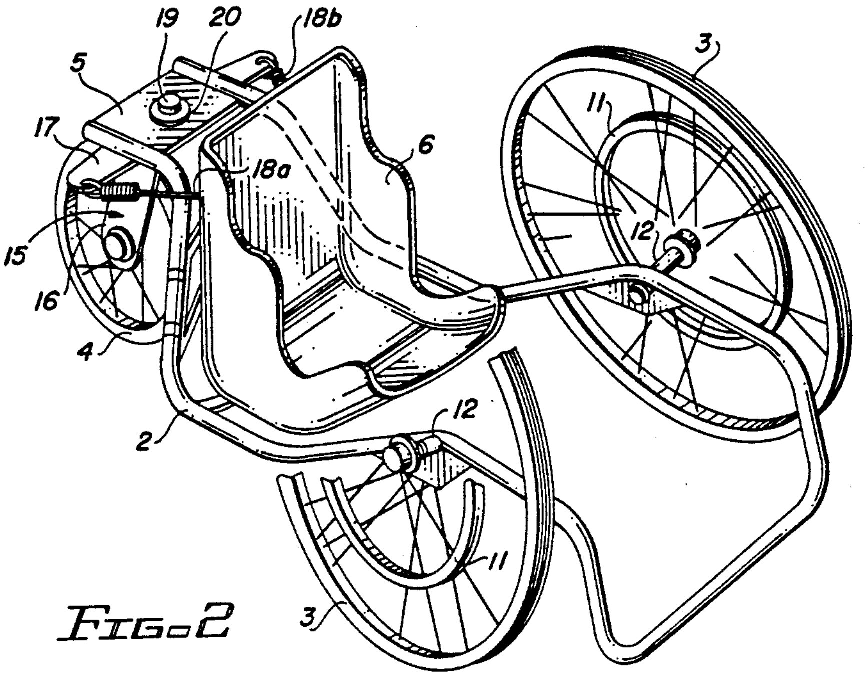
FIG. 2
FIG. 3
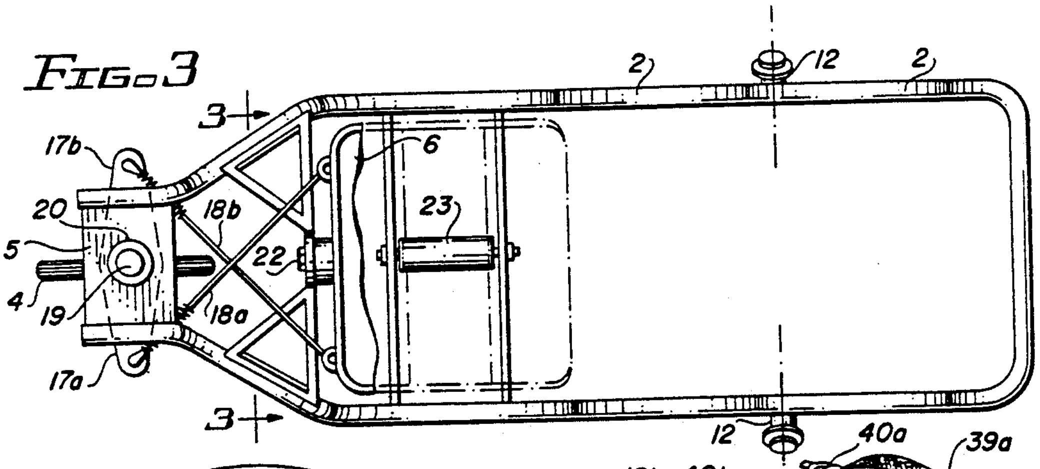
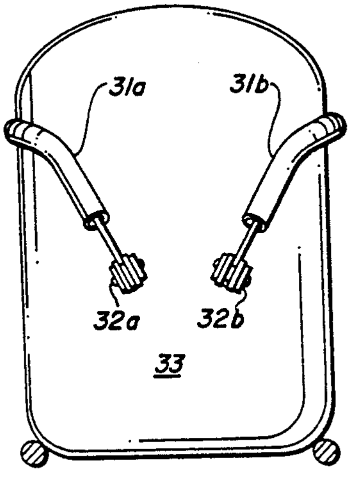
FIG. 7
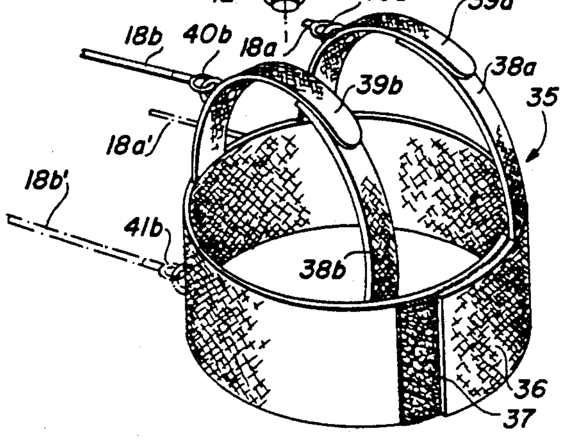
FIG. 8

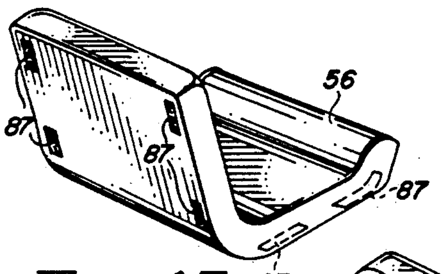
FIG. 15
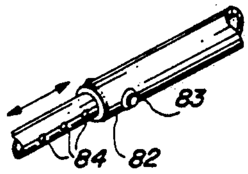
FIG. 13
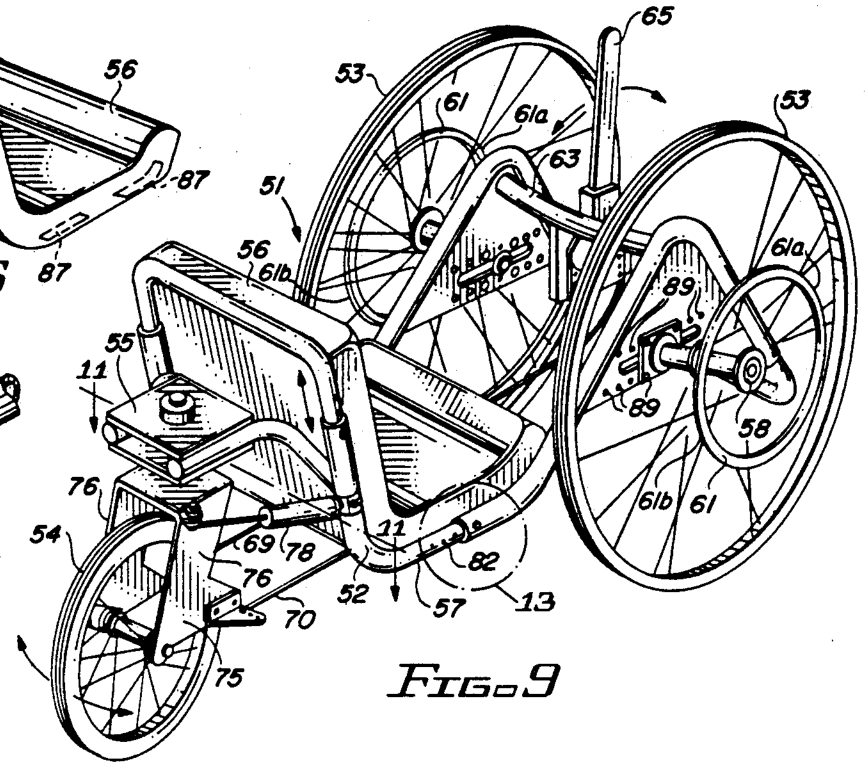
FIG. 9
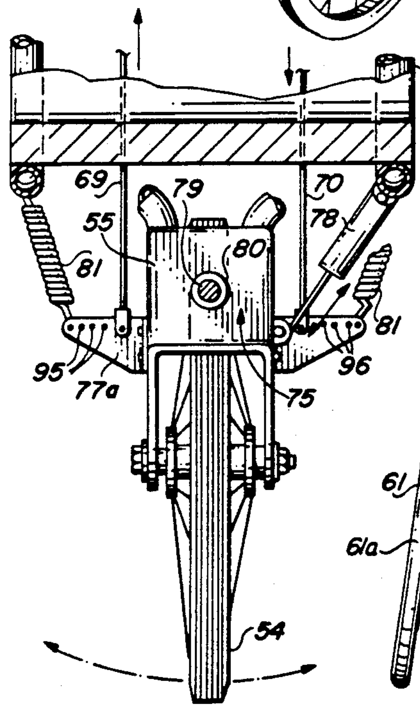
FIG. 11
FIG. 10
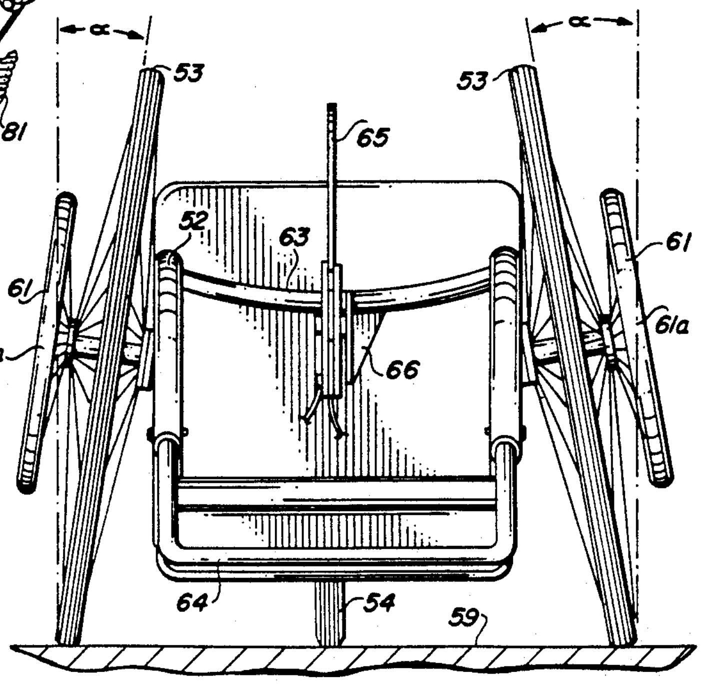

RACING WHEELCHAIR

FIELD OF THE INVENTION

This invention relates to the art of wheelchairs and, more particularly, to racing wheelchairs which incorporate positive steering under direct control of the athlete.

BACKGROUND OF THE INVENTION

In recent years, physically handicapped individuals have aggressively sought to enjoy and challenge life to the fullest extent possible considering their individual situations. For many such individuals, an important aspect of their lifestyles has included serious participation in athletic competitions, and these competitions have developed to the extent that Handicapped Olympics were held in Seoul, Korea, shortly after the traditional Olympic Games, a tradition which may be expected to continue and expand. Local, regional, national and international games for the handicapped are now common, and the level of competition and accomplishments which have been attained are a source of wonder to the public at large and well deserved pride to the handicapped athletes.

One class of competition is wheelchair racing in which events ranging from short sprints to full marathons (often ran concurrently on the same course with the conventional marathon). As those skilled in the art will appreciate, the times of the handicapped athletes, particularly in the longer races such as the marathon, are often better than those of the unhandicapped athletes.

For the most part, participants in wheelchair races have employed fairly conventional racing chairs which have been carefully prepared by ensuring very free rotation of the wheels, a comfortable seat, stability, ease of accessing the wheel drive rings (typically by applying a radical camber to the large wheels), etc. Steering has been accomplished by more or less conventionally by momentarily introducing a deliberate differential into the rotation rates of the two large wheels, the small wheels being eccentrically pivoted to simply follow the path of the wheelchair in the conventional fashion to thus continue their normal function of providing overall stability to the wheelchair.

However, as the level of performance has increased, it has become evident that even fairly radically modified conventional wheelchairs are themselves the source of equipment imposed limitations on the times which can be attained. The stability and steering of the chair as well as the fixed and relatively high position of the athlete in the chair have constituted decided problem areas, and it is to addressing these problem areas in racing wheelchairs that my invention is directed.

OBJECTS OF THE INVENTION

It is therefore a broad object of my invention to provide an improved racing wheelchair.

It is another object of my invention to provide a racing wheelchair in which the position of the athlete is established to increase the stability of the chair while simultaneously providing improved access to the drive rings.

With respect to this aspect, it is an object of my invention to provide a racing wheelchair in which the position of the athlete in the chair is very low.

In another aspect of my invention, it is an object of my invention to provide a racing wheelchair in which positive steering is obtained by controlling the position of a trailing wheel.

With respect to this aspect, it is an object of my invention to provide a first variant in which steering is effected through a cable system under the control of the lateral position of a laterally shiftable seat.

It is another object of my invention to provide a second variant in which steering is effected through a cable system under the control of the position of a harness worn by the athlete.

It is yet another object of my invention to provide a third variant, similar to the second variant, in which steering is effected through a cable system under the control of the respective positions of the athlete's right and left biceps.

It is still yet another object of my invention, in a presently preferred embodiment, to provide an improved racing wheelchair in which the position of the athlete is established to be very low in order to increase the stability of the chair while simultaneously providing improved access to the drive rings, and in which positive steering is obtained by controlling the position of a trailing wheel through a cable system under the direct influence of a hand operated handle adapted for fore and aft movement and coupled through cables to the steerable trailing wheel.

SUMMARY OF THE INVENTION

Briefly, these and other objects of my invention are achieved in a racing wheelchair including a frame supported on a pair of large wheels and a trailing, preferably positively steerable, trailing wheel. A seat for the athlete is suspended from a central position of the frame and is configured such that the athlete sits in a very low position wherein the knees of the driver are supported above the axles of the drive wheels and in the area defined by vertical planes tangent the leading edges **61*a* and trailing edges 61*b*** of the drive rings, to improve stability of the racing wheelchair in use and to advantageously place the leverage of the athlete's arms on a pair of drive rings situated outboard the large wheels. Positive steering of the trailing wheel may be accomplished in various ways. One embodiment employs a laterally pivotal seat structure with actuating cables connected to the seat back such that pivotal motion of the seat, as the athlete leans into a turn, is translated via a pulley system to generally horizontal motion which is communicated to the trailing wheel to effect steering. Another embodiment utilizes actuating cables attached to cuffs around the athlete's biceps such that the natural tendency to twist into a turn can be translated, via the cables, into steering forces on the trailing wheel. Yet another embodiment utilizes a harness strapped to the athlete with the actuating cables being attached to shoulder straps of the harness or at a lower position, according to the preference and/or capability of the athlete, such as to a girth portion of the harness. Steering can then be effected by a twisting of the athlete's torso. Still another, and currently the preferred, embodiment employs a hand operated handle adapted for fore and aft movement and coupled through cables to the steerable trailing wheel which is positively biased to a central, straight ahead position or to a slight deliberate deviation therefrom.

DESCRIPTION OF THE DRAWING

The subject matter of the invention is particularly pointed out and distinctly claimed in the concluding portion of the specification. The invention, however, both as to organization and method of operation, may best be understood by reference to the following description take in conjunction with the subjoined claims and the accompanying drawing of which:

FIG. 2 is a partially broken away three-quarter view from the right front of the racing wheelchair in a first principal variation thereof;

FIG. 3 is a partially broken away, partial view from the top which particularly shows certain important aspects of the racing wheelchair frame and steering mechanism of the first principal variation;

FIG. 7 is a fragmentary rear view further illustrating the variant configuration of FIG. 6;

FIG. 8 is an isolated view of a harness to be worn by the athlete and which may be coupled to the steering mechanism in another variant configuration;

FIG. 9 is a pictorial view from the right, rear of a presently preferred embodiment of the invention as also shown in FIG. 1 and constituting a second principal variation of the invention;

FIG. 10 is a front view of the embodiment shown in FIGS. 1 and 9;

FIG. 11 is a fragmentary view broken away in the region X—X of FIG. 9 and particularly illustrating certain details of the positive steering system;

FIG. 13 is an enlarged fragmentary view of the region Y in FIG. 9 illustrating the manner in which the frame of the racing wheelchair may be adjusted to accommodate an individual athlete;

FIG. 15 is a view of the racing wheelchair seat illustrating one manner in which seats may be changed out to accommodate different athletes or the preference for an athlete for the seat to be used in a given event.

DETAILED DESCRIPTION OF THE INVENTION

Figure 1:
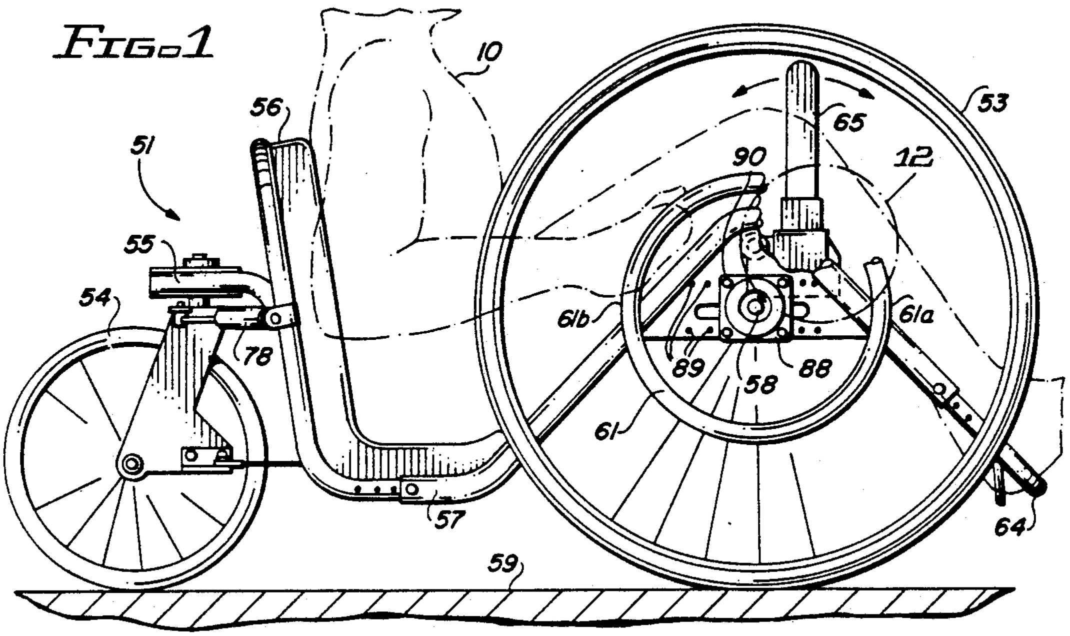
FIG. 1 is a side view of the racing wheelchair of a preferred embodiment of the subject invention particularly illustrating the position assumed by the athlete in its use.

Referring now to FIG. 1, the basic configuration of a presently preferred embodiment of the invention is shown. Thus, a racing wheelchair 51 includes a frame 52, a pair of forwardly mounted large wheels 53 (only the right large wheel 53 being visible in FIG. 1) suspended from the frame 52, a trailing wheel 54 pivotally suspended from an aft portion 55 of the frame 52 and a seat 56 carried by the frame 2 at a central position. (The trailing wheel 54 may be doubled to provide a closely spaced pair of trailing wheels if desired.)

It will be particularly noted that the lowermost portion 57 of the seat 56 is positioned well below the axes 58 of the large wheels 53, and preferably closer to the bottom of the large wheels 53 (and hence closer to the surface 9 of the surrounding terrain) than to a vertical position at the height of the axes 58 above the surface 59. This is an important feature of the subject racing wheelchair in all its variations and contributes significantly to its stability and performance in use by substantially lowering its center of gravity and providing an optimum position for an athlete 10 to apply motive force to the large wheels. In addition, as will become more apparent below, the trailing wheel 54 can be controlled by the athlete 10 situated in the seat 5 to obtain positive steering. Some athletes may prefer to employ two laterally spaced apart trailing wheels for slightly increased stability at the expense of slightly increased friction in the overall rolling system. Propulsion of the racing wheelchair 51 is effected by the athlete 10 actuating drive rings 61 concentrically mounted on the outboard sides of the large wheels 3 in the well-known manner.

As best seen in FIG. 1 and FIG. 9, the knees of the driver are supported by transverse knee support 63 in a position above the axis of the drive wheels and in the area defined by vertical planes tangent the leading edges 61*a* and trailing edges 61*b* of the drive rings. The advantages of this arrangement are more power, more stability and more positive control of the racing wheelchair in the drive.

Attention is no directed to FIGS. 2 and 3 which show additional structure of the racing wheelchair in a first principal variation as well as certain component orientations which are not evident from or shown by FIG. 1 which reveals a second principal variation to be discussed presently. In particular, stationary spindles 12 are each fixed to a frame 2 at an acute angle with respect to the horizontal to obtain a substantial negative camber to large wheels 3 in order to improve stability and access by the athlete to drive rings 11. A trailing wheel 4 is pivotally suspended from the aft portion 5 of the frame 2 to permit direct steering of the racing wheelchair by the athlete. Referring also to FIG. 3, a fork structure 15 includes downwardly depending legs 16 for rotatably supporting the trailing wheel 4 and outwardly directed wing elements 17 to which first ends of steering cables 18*a*, 18*b* are attached. A vertical upper pivot 19 of the fork structure 15 extends through a journal 20 in the aft portion 5 of the frame 2. With this or equivalent construction, it will be understood that positive steering of the trailing wheel 4 may be effected by appropriately pulling one of the steering cables 18*a*, 18*b* while releasing the other to permit pivoting motion about the axis of the upper pivot 19 of the entire fork structure 15.

Figure 4A:
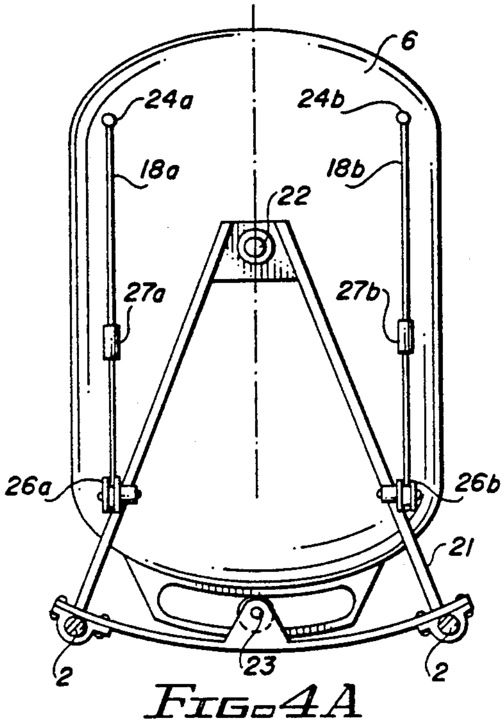
FIGS. 4A and 4B illustrate, respectively, centralized and tilted positions of the wheelchair seat and the manner in which, in one variant of the steering mechanism, the athlete ma obtain positive steering action by shifting the position of the seat during a turn.
Figure 4B:
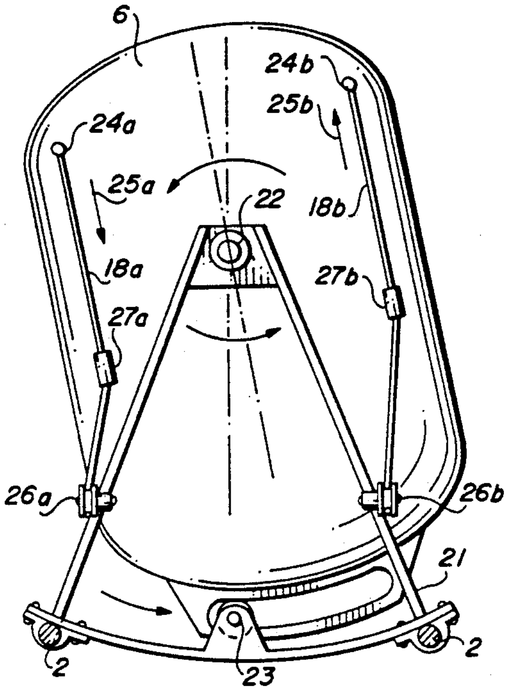
Figure 5:
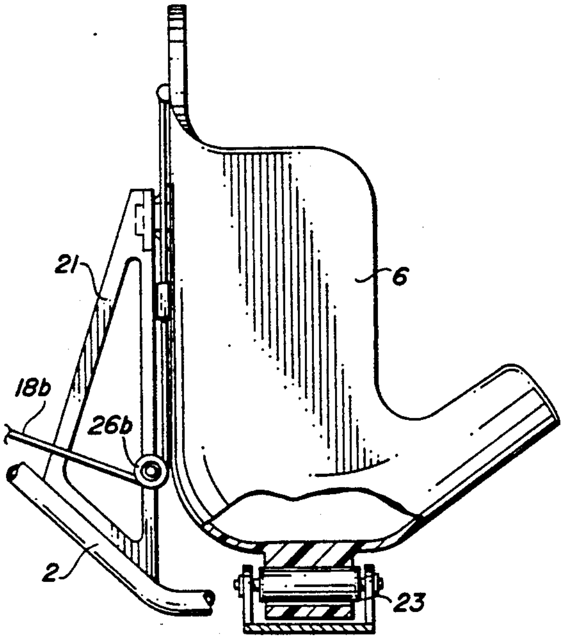
FIG. 5 is a fragmentary side view further illustrating the manner in which the seat ay be suspended and coupled to the steering mechanism.

Consider now a first specific configuration for the steering mechanism as shown in FIGS. 4A, 4B and 5 while still referring also to FIG. 3. The back of the seat 6 is pivotally fixed to an upright frame member 21 by a pivot/journal assembly 22. Most of the weight of the seat and the athlete is taken by a roller member 23 which is best illustrated in FIGS. 3 and 5. It will therefore be understood that the seat can pivot about the axis of the pivot/journal assembly 22 such that all points on the back of the seat (except for those instantaneously falling on a vertical line through the pivot axis) which are positioned radially outward of that axis will have a vertical movement component as the seat pivots. If the ends of the cables 18*a* and 18*b* are respectively connected, for example, to the points 24*a* and 24*b*, pivotal movement of the seat 6 from the position shown in FIG. 4A to that shown in FIG. 4B will bring about linear travel of the cable 18*a* in the direction indicated by the arrow 25*a* while the cable 18*b* will travel linearly in the direction indicated by the arrow 25*b*. Some adjustment in the amount of vertical travel obtained by a given angular translation of the seat 6 can be achieved by selecting both vertical and/or horizontal positions of the attachment points 24*a*, 24*b;* however, care must be taken to select mirror image points about the vertical passing through the pivot axis in order to ensure equal travel (in opposite directions) of the cables 18*a*, 18*b* for a given pivotal movement.

The generally vertical cable movement resulting from pivotal motion of the seat is translated to generally horizontal movement by passing the cables across pulleys 26*a*, 26*b*. These pulleys may be pivotally mounted to accommodate the angular change of the path of the cables resulting from the horizontal component of the paths followed by the attachments points 24*a*, 24*b*. Alternatively, sleeve guides 27*a*, 27*b* fixed to the back of the seat 6 at positions below the pivot axis and generally aligned with the pulleys 26*a*, 26*b* when the seat is in the central position illustrated in FIG. 4A may be employed with fixed pulleys to ensure that the cables pass across the pulleys in the correct alignment. Another equivalent structure is to use fixed pulleys 26*a*, 26*b* and pivotally mounted pulleys in place of the sleeve guides 27*a*, 27*b*.

As best shown in FIG. 3, the cables 18*a*, 18*b* cross in their respective paths to their points of attachment to the wing elements 17. The reason for this arrangement will become clear as the description of the operation of the steering mechanism proceeds. Consider that the racing wheelchair is approaching a left turn. As the turn is entered, the natural tendency of the athlete is to lean to the left to counteract the destabilizing effects of centrifugal force on both the chair and on the athlete per se. This lean produces the pivotal motion of the seat 6 shown in FIG. 4B, the degree of rotation, of course, being related to the intensity of the lean which the athlete can exercise judgement to control. Consequently, the cables 18*a*, 18*b* travel linearly in the directions indicated by the arrows 25*a*, 25*b*. The, in effect, pull by cable 18*b* on the wing element 17*b* and payout of cable 18*a* to wing element 17*a* results in positive and controlled pivoting motion of the entire fork structure 15, and hence the trailing wheel 4, to obtain positive steering in the left turn direction under the control of the athlete.

Conversely, when entering a right turn, the athlete will lean to the right resulting in linear travel of the cables 18*a*, 18*b* in the opposite directions from those indicated by the arrows 25*a*, 25*b*. This results, in effect, in pull by the cable 18*a* on the wing element 17*a* and payout of the cable 18*b* to the wing element 17*b*, thus causing pivotal motion of the trailing wheel in the direction of the right turn.

Figure 6:
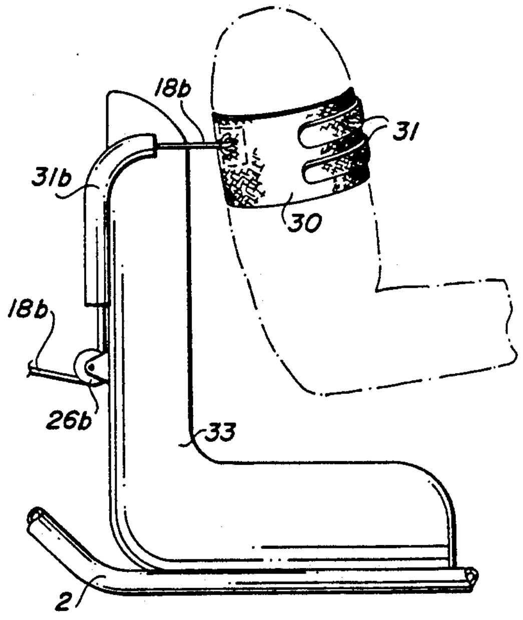
FIG. 6 is a fragmentary side view illustrating a variant configuration for actuating the steering mechanism using a cuff around the athlete's biceps.

Some athletes may prefer a seat rigidly fixed to the frame and desire even more direct control of the steering effected by bringing about the pivotal movement of the trailing wheel 4. One variant configuration for achieving these ends is shown in FIGS. 6 and 7. In this configuration, the cables 18*a*, 18*b* are connected to cuffs which extend around the biceps of the athlete. An exemplary cuff 30 is shown in FIG. 6. The cuff 30 may be adjusted and held in place by the incorporation of fixtures 31 using hook and loop construction such as that marketed under the trademark Velcro. The generally horizontal motion imparted to the cable 18*b* by the fore and aft component of the movement of the athletes biceps is converted to generally vertical movement by sleeve guides 31*a*, 31*b* and then back to generally horizontal movement by the pulleys 32*a*, 32*b* which functionally correspond to the pulleys 26*a*, 26*b* shown in FIGS. 4A and 4B except for their placement nearer the center of the back of the seat 33. The structure rearwardly of the pulleys 32*a*, 32*b* is as previously described in conjunction with FIGS. 4A and 4B.

Thus, when the athlete enters a left turn, the natural tendency to not only lean to the left, but also to somewhat twist the torso by bringing the right shoulder forwardly and the left shoulder rearwardly, will be coupled through the cables 18*a*, 18*b* to the trailing wheel 4 to effect positive steering through the corner. Conversely, when the athlete enters a right turn, torso twist in the opposite direction is communicated to the steering mechanism to effect positive steering through the corner.

It has been found that the biceps attachment is somewhat difficult to control and is somewhat constraining since the pull on one cable must be rather closely matched by payout of the other cable. Further, the propulsion of the large wheels communicated through the drive rings naturally requires motion of the biceps which has more or less in phase fore and aft movement components which causes both cables to go slightly slack each cycle of effort. When the cables are slack, the trailing wheel is not fully under direct control. This potential problem can be considerably mitigated by offsetting the axis of the trailing wheel to the rear of the vertical pivot axis of the fork structure; i.e., in a caster arrangement. This arrangement results in a preference of the trailing wheel, when not under direct control to follow the instantaneous direction of the chair.

Nonetheless, many athletes may prefer a steering actuation arrangement in which it is fore and aft movement of the shoulders, rather than the biceps, which impels the cables. Others may prefer to steer by twisting movement of the torso. Such operation may be readily achieved by the use of a harness such as that illustrated in FIG. 8. The harness 35 has a girth portion 36 which encompasses the torso of the athlete and may be adjustably strapped on by the incorporation of a hook and loop coupling fastener 37 or by functionally equivalent structure. Shoulder straps 38*a*, 38*b*, which may also incorporate hook and loop fasteners 39*a*, 39*b* or their functional equivalent for convenience in strapping on the harness. Positioned on the rear sections of the straps 38*a*, 38*b* are attachment points 40*a*, 40*b* for respectively connecting the cables 18*a*, 18*b* to the harness at positions whose fore and aft movements can be controlled by the athlete by dynamically adjusting the positions of the shoulders.

For those athletes who might prefer to effect the steering operation by twisting the torso, attachment points positioned on the girth section 36 of the harness may be employed as exemplified by the attachment point 41*b* to which cable 18*b'* is attached, it being understood that a similar attachment point, out of view in FIG. 8, is provided for cable 18*a'*.

With either variation using the harness 35 or equivalent structure, the cables may be led rearwardly as previously described or in some equivalent fashion to couple the controlled movements of the athlete's body to the steering mechanism to obtain direct control of the steering position of the trailing wheel.

Attention is now directed to FIGS. 1, 9, 10 and 11 which illustrate a refined and presently preferred embodiment of the invention and which constitutes a second principal variation. The preferred embodiment is similar, in many aspects, to the variations described so far. Thus, as previously discussed with respect to FIG. 1, racing wheelchair 51 includes a frame 52, a pair of forwardly mounted large wheels 53 suspended from the frame 52, a trailing wheel 54 pivotally suspended from an aft portion 55 of the frame 52 and a seat 56 carried by the frame 52 at a central position. It will again be noted that the lowermost portion 57 of the seat 56 is positioned well below the axes 58 of the large wheels 53 and preferably closer to the bottom of the large wheels 53 (and hence closer to the surface 59 of the surrounding terrain) than to a vertical position at the height of the axes 58. Propulsion of the racing wheelchair 51 is effected by the athlete actuating drive rings 61 concentrically mounted on the outboard sides of the large wheels 53 in the well-known manner.

As shown in FIGS. 9 and 10, the frame 52 includes a transverse knee support 63 situated at a high position more or less over the axes of the large wheels 53 and a forward foot rest region 6 for supporting the feet of the athlete. Since the physical dimensions of individual athletes differ markedly, numerous dimensional and operational adjustments are provided as will be discussed more particularly below. The frame 52 also carries a steering lever 65 centrally positioned for fore and aft movement between the frame sides and just forward of the knee support 63. The steering lever 65 may be supported on a cantilever bracket 66 from one side of the frame as best shown in FIG. 10 or may be supported directly on the knee support 63. In its central position, the steering lever 65 will reside between the athlete's legs in the region of the knees during operation for ready access for controlling positively the steering of the wheelchair as to be described by manually controlled fore and aft movement.

The steering mode of the second principal variation is a primary distinction with respect to the first principal variation. Consider FIG. 12 which is an enlarged view of the region Z of FIG. 1. Steering lever 65 pivots about an axis 67 by which it is pivotally fixed for fore and aft movement to the bracket 66 such that the lower portion 68 of the lever 65 also translates fore and aft, but out of phase with the upper portion which is grasped by the athlete. As a result, cables 69, 70, which are connected in oppositely facing positions to the lower portion 68 of the lever 65, move linearly. Since the cable 70 is redirected rearwardly, it will be understood that the cables 69, 70 move equal linear amounts, but in opposite directions as the handle 65 is manipulated by the athlete. The housings 71, 72 of the cables 69, 70 are fixed to the bracket 66 at positions 73, 74 in the conventional manner to maintain them in place as the cables move.

Referring to FIGS. 9 and 11, the trailing wheel 54 is pivotally suspended form the aft portion 55 of the frame 52 to permit direct steering of the racing wheelchair by fore and aft manipulation of the steering lever 65 by the athlete. A fork structure 75 includes downwardly depending legs 76 for rotatable supporting the trailing wheel 54 and outwardly directed wing elements 77*a*, 77*b* to which ends of steering cables 69, 70 are respectively attached. A vertical upper pivot 79 extends through a journal 80 in the aft portion 55 of the frame 52. With this or equivalent structure, it will be apparent that positive steering of the trailing wheel 54 may be effected by manipulating the steering lever 65 fore and aft. I.e., if the upper portion of the steering lever 65 is pushed forwardly by the athlete, the cable 70 is pulled forwardly while the cable 69 is paid out rearwardly.

This linear movement is communicated to the wing elements 77*a*, 77*b* with the result that the fork structure 75, and hence the trailing wheel 54, pivots about the pivot 79 to steer the racing wheelchair 51 to the right as it moves forward. Conversely, if the upper portion of the steering lever 65 is pulled rearwardly by the athlete, the cable 69 is pulled forwardly while the cable 70 is paid out rearwardly. This linear movement is communicated to the wing elements 77*a*, 77*b* with the result that the fork structure 75, and hence the trailing wheel 54, pivots about the pivot 79 to steer the racing wheelchair 51 to the left as it moves forward. Optionally, shock absorber 78 may be suspended between the fork structure 75 and the frame 52 to dampen lateral high frequency vibrations of the fork structure and hence enhance the stability of the racing wheelchair as the trailing wheel 54 encounters irregularities along the surface of the terrain.

It will be noted that the horizontal axis of the trailing wheel 54 is offset rearwardly from the vertical axis of the pivot 79. With this construction, forward movement of the racing wheelchair 51 will bias the steering action to the central, straight ahead position. This feature improves overall control of the steering system and relieves the athlete from constant attention to the steering lever 65. Optionally, as shown in FIG. 11, tension springs 81 may be provided to further positively bias the steering action to the central, straight ahead position. Tension springs 81 extend between the outer regions of the wing elements 77*a*, 77*b* to the frame 52 such that deviation of the trailing wheel 54 from the central position will unbalance the system causing more tension to reside in one of the tension springs 81 than the other to obtain the desired bias for which the spring rates of the tension springs may be selected.

For some courses, for example, those in which a significant crown is present, it may be desirable to have the nominal central position actually provide a slight steer into the crown. This may be achieved by an appropriate adjustment to slightly alter the effective length of the cables, 69, 70 with respect to one another, or under the direct control of the athlete by slightly altering the position of the steering lever 65 to compensate for the crown, or by intentionally unbalancing the rates of the tension springs 81 or by any combination of these or functionally similar elements in the steering system.

Figure 14:
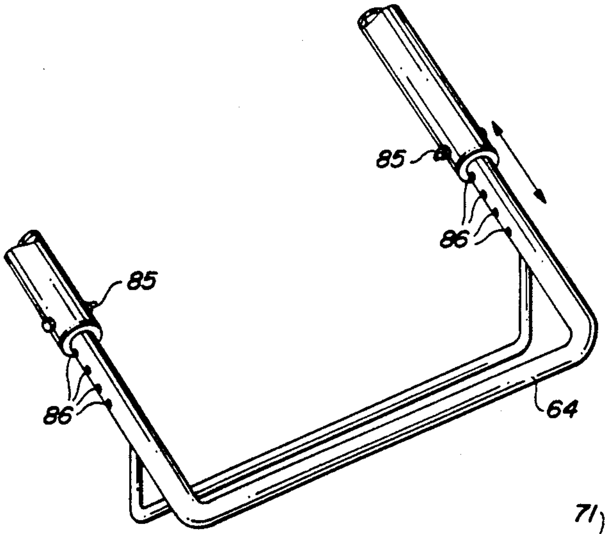
FIG. 14 is a fragmentary view of the footrest region of the frame of the racing wheelchair illustrating the manner in which the frame may be adjusted to accommodate athletes having differing leg lengths or knee angle preferences.

Preferably, certain parts of the frame 52 are adjustable in order to comfortably accommodate athletes of various sizes. Referring to FIG. 13 it will be observed that the region 82 of the frame 52 is adjustable in length to change the length of the frame between the seat 56 and the transverse knee support 63 by the selective positioning of pins 8 in spaced apertures 84. Similarly, referring to FIG. 14, the length of the frame 52 between the transverse knee support 63 and the forward foot rest 64 may be adjusted by the selective position of pins 85 in spaced apertures 86.

The seat 56 may be molded to the dimensions and preferences of an individual athlete and may also be rendered easily exchangeable by the use of, for example, hook and loop fastener regions 87 as shown in FIG. 15.

Figure 12:
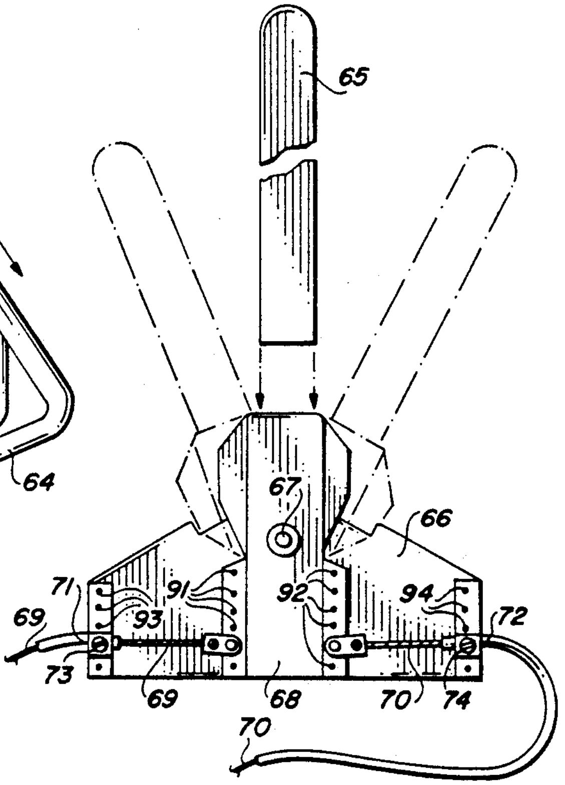
FIG. 12 is an enlarged fragmentary view of the region Z in FIG. 1 illustrating the effect of moving a steering lever fore and aft on steering cable components.

Mechanical adjustments to prepare the racing wheelchair for use by an individual athlete on a given course are also contemplated. Thus, as best shown in FIGS. 1 and 9, the fore and aft position of the large wheels 53 may be established by moving wheel support brackets 88 to the desired position with respect to aperture sets 89 and securing them in place with nut and bolt assemblies 90. As shown in FIG. 12, the advantage ratio of the steering lever 65, and hence the sensitivity of the steering, may be adjusted my moving the cables 69, 70 up or down on the lower portion 68 of the steering lever. This may be achieved by providing vertical arrays 91, 92, 93, 94 for respectively securing the ends of the cables 69, 70 to the lower portion 68 of the steering lever 65 and the cable housings 71, 72 to the cantilever housing 66. As best shown in FIG. 11, the steering sensitivity may be further adjusted by altering the attachment positions of the ends of the cables 69, 70 to the wing elements 77*a*, 77*b* in the aperture arrays 95, 96.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A racing wheelchair comprising:

A) a frame;

B) first and second large wheels, having axes, said wheels rotatably suspended, respectively, from left and right sides of said frame;

C) first and second drive rings carried, respectively, concentrically on outboard therewith;

D) a trailing wheel pivotally suspended from said frame and disposed rearwardly of said pair of large wheels such that said frame is supported for rolling movement on said pair of large wheels and said trailing wheel;

E) a seat suspended from said frame and situated intermediate said pair of large wheels, said seat including a lowermost portion positioned below the axes of said large wheels;

F) steering means for positively and continuously establishing the pivotal position of said trailing wheel under control of an athlete supported in said seat; and G) knee support means above the axes of the large wheels.

2. The racing wheel chair of claim 1 in which said lowermost portion of said seat is closer to the bottom of said large wheels than to a vertical position at the height of the axes of said large wheels.

3. The racing wheelchair of claim 1 in which said steering means is coupled to and responsive to the position of said seat.

4. The racing wheelchair of claim 1 in which said steering means is coupled to and responsive to the body position of the athlete supported in said seat.

5. The racing wheelchair of claim 1 in which said steering means includes:

A) a steering element positioned on said frame so as to be manually actuable by the athlete supported in said seat; and B) at least one cable coupled between said steering element and said trailing wheel.

6. The racing wheelchair of claim 2 in which said steering means includes:

A) a steering element positioned on said frame so as to be manually actuable by the athlete supported in said seat; and B) at least one cable coupled between said steering element and said trailing wheel.

7. The racing wheelchair of claim 5 in which said steering means further includes biasing means for urging said trailing wheel to a desired central position.

8. The racing wheelchair of claim 1 in which said steering means further includes biasing means for urging said trailing wheel to a desired central position.

9. The racing wheelchair of claim 6 in which said steering means further includes biasing means for urging said trailing wheel to a desired central position.

10. The racing wheelchair of claim 7 which further includes means for selectively establishing the steering sensitivity of said steering means.

11. The racing wheelchair of claim 8 which further includes means for selectively establishing the steering sensitivity of said steering means.

12. The racing wheelchair of claim 9 which further includes means for selectively establishing the steering sensitivity of said steering means.

13. A racing wheelchair comprising:

A) a frame;

B) first and second large wheels having axes and rotatably suspended, respectively, from left and right sides of said frame;

C) first and second drive rings carried, respectively, concentrically on outboard sides of said first and second large wheels for rotation therewith;

D) a trailing wheel pivotally suspended from said frame and disposed rearwardly of said pair of large wheels such that said frame is supported for rolling movement on said pair of large wheels and said trailing wheel;

E) a seat suspended from said frame and situated intermediate said pair of large wheels, said seat further comprising a lowermost portion which is positioned below the axes of said large wheels; and F) steering means for positively and continuously establishing the pivotal position of said trailing wheel under control of an athlete supported in said seat.

14. The racing wheelchair of claim 13 in which said lowermost portion of said seat is closer to the bottom of said large wheels than to a vertical position at the height of the axes of said large wheels.

15. The racing wheelchair of claim 13 in which said steering means is coupled to and responsive to the position of said seat.

16. The racing wheelchair of claim 13 in which said steering means is coupled to and responsive to the body position of the athlete supported in said seat.

17. The racing wheelchair of claim 13 in which said steering means includes:

A) a steering element positioned on said frame so as to be manually actuable by the athlete supported in said seat; and B) at least one cable coupled between said steering element and said trailing wheel.

18. The racing wheelchair of claim 13 in which said steering means includes:

A) a steering element positioned on said frame so as to be manually actuable by the athlete supported in said seat; and B) at least one cable coupled between said steering element and said trailing wheel.

19. The racing wheelchair of claim 14 in which said steering means includes:

A) a steering element positioned on said frame so as to be manually actuable by the athlete supported in said seat; and B) at least one cable coupled between said steering element and said trailing wheel.

20. The racing wheelchair of claim 17 in which said steering means further includes biasing means for urging said trailing wheel to a desired central position.

21. The racing wheelchair of claim 18 in which said steering means further includes biasing means for urging said trailing wheel to a desired central position.

22. The racing wheelchair of claim 19 in which said steering means further includes biasing means for urging said trailing wheel to a desired central position.

23. The racing wheelchair of claim 20 which further includes means for selectively establishing the steering sensitivity of said steering means.

24. The racing wheelchair of claim 21 which further includes means for selectively establishing the steering sensitivity of said steering means.

25. The racing wheelchair of claim 22 which further includes means for selectively establishing the steering sensitivity of said steering means.

* * * * *

UNITED STATES PATENT AND TRADEMARK OFFICE
CERTIFICATE OF CORRECTION

PATENT NO. : 5,028,064

DATED : July 2, 1991

INVENTOR(S) : John M. Johnson

It is certified that error appears in the above-identified patent and that said Letters Patent is hereby corrected as shown below:

On the title page, item [76] Inventors:

Inventor's middle initial is changed from "W" to --M--.

Column 9:

In Claim 1, subsection C) line 41 --sides of said first and second large wheels for rotation-- is inserted between "outboard" and "therewith".

Signed and Sealed this

Third Day of November, 1992

*Attest:*

DOUGLAS B. COMER

*Attesting Officer*

*Acting Commissioner of Patents and Trademarks*